Figure 1:
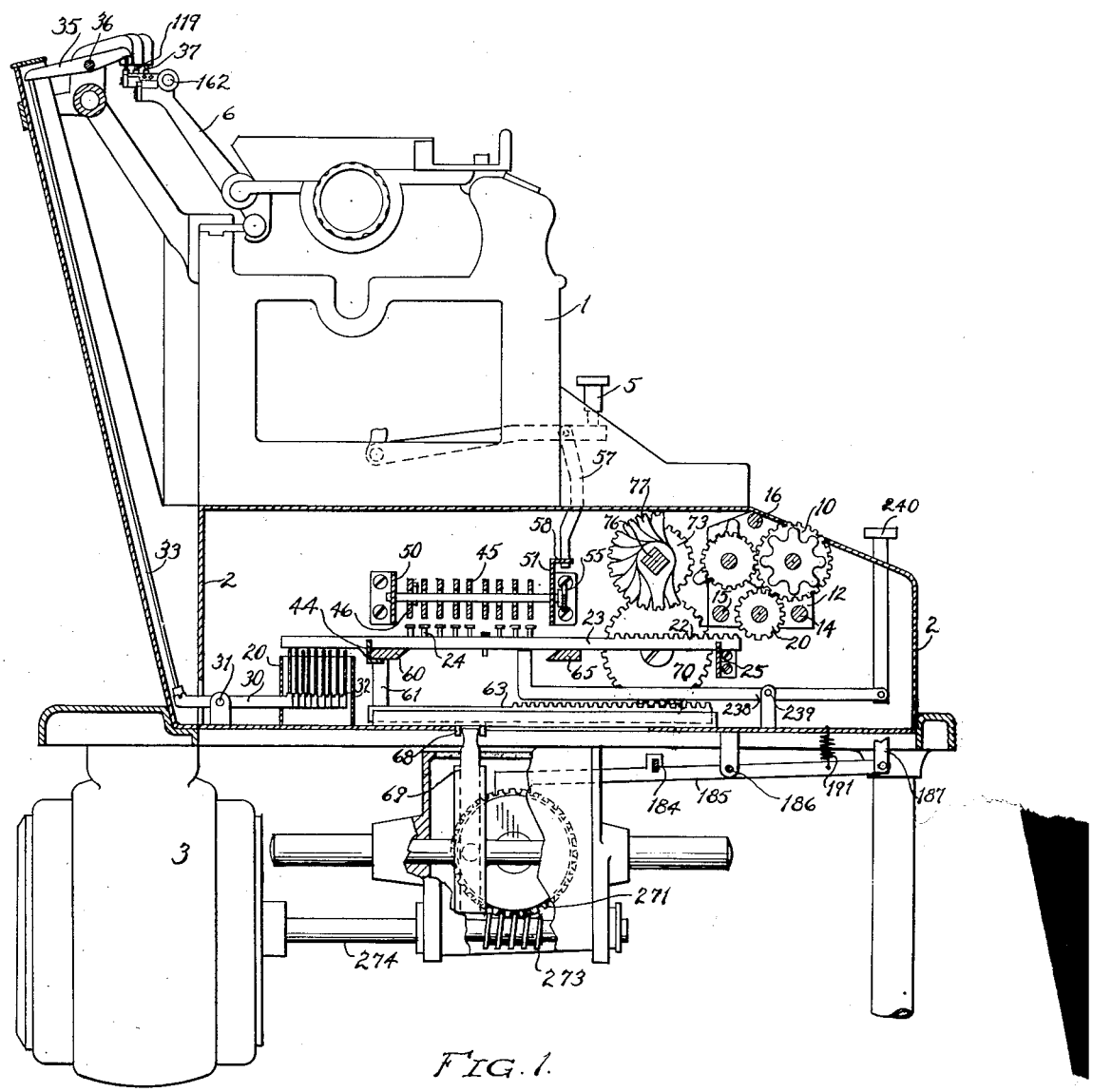

H. MARSHALL.
COMBINED TYPE WRITING AND COMPUTING MACHINE.
APPLICATION FILED NOV. 12, 1912.

1,147,959.

Patented July 27, 1915.
5 SHEETS—SHEET 2.

H. MARSHALL.
COMBINED TYPE WRITING AND COMPUTING MACHINE.
APPLICATION FILED NOV. 12, 1912.

1,147,959.

Patented July 27, 1915.

5 SHEETS—SHEET 3.

WITNESSES:
Justin W. Macklin.
R. L. Bruck.

INVENTOR
Holmes Marshall
By Albert H. Baker,
ATT'Y.

H. MARSHALL.
COMBINED TYPE WRITING AND COMPUTING MACHINE.
APPLICATION FILED NOV. 12, 1912.
1,147,959.
Patented July 27, 1915.
5 SHEETS—SHEET 4.
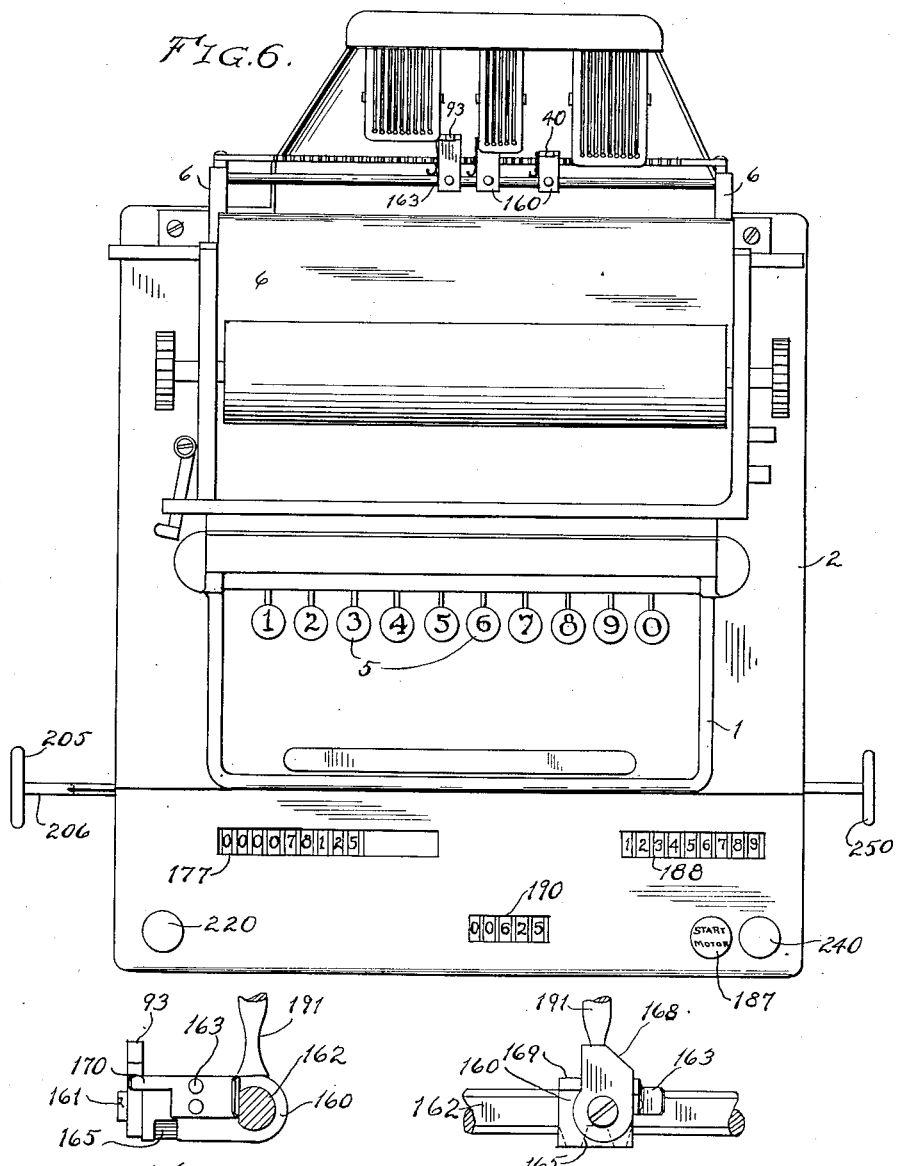

H. MARSHALL.
COMBINED TYPE WRITING AND COMPUTING MACHINE.
APPLICATION FILED NOV. 12, 1912.
1,147,959.
Patented July 27, 1915.
5 SHEETS—SHEET 5.
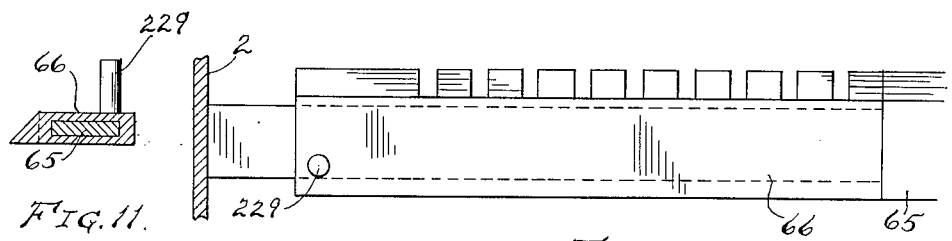
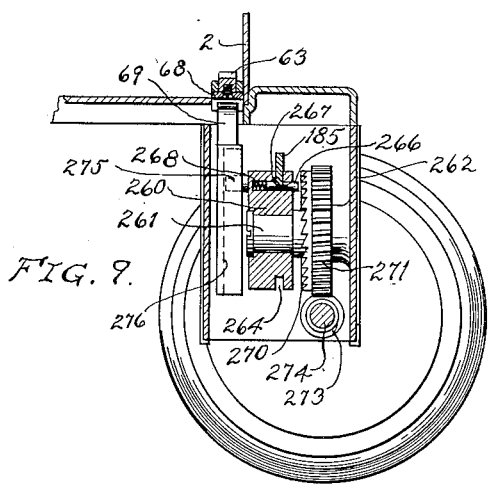
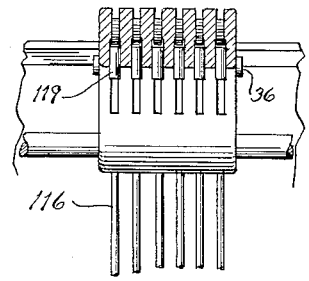
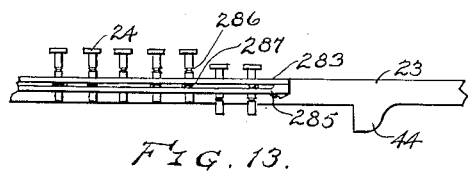
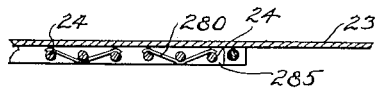
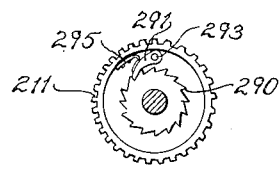
WITNESSES:
Justin W. Macklin
R. L. Bruck
INVENTOR:
Holmes Marshall,
BY Albert K. Baker,
ATT'Y.

UNITED STATES PATENT OFFICE.

HOLMES MARSHALL, OF CLEVELAND, OHIO.

COMBINED TYPE-WRITING AND COMPUTING MACHINE.

1,147,959. Specification of Letters Patent. Patented July 27, 1915.

Application filed November 12, 1912. Serial No. 730,899.

*To all whom it may concern:*

Be it known that I, HOLMES MARSHALL, a citizen of the United States, residing at Cleveland, in the county of Cuyahoga and State of Ohio, have invented a certain new and useful Improvement in Combined Type-Writing and Computing Machines, of which the following is a full, clear, and exact description, reference being had to the accompanying drawings.

The object of this invention is to provide in a combined typewriter and computing machine a mechanism by which multiplications or extensions can be performed on one part of the machine, and the results of such multiplications added automatically on another part of the machine. With such a mechanism, in making out an ordinary bill, the typist merely writes the item and the price and these are automatically multiplied together, and the results are shown in the adding mechanism, and the typist copies the amount so shown into the extension column on the paper, and all of these extensions are added automatically in the mechanism, thereby showing the total corresponding to the full amount of the bill. To accomplish this I provide, in conjunction with a typewriting machine, computing mechanism which is set as the amount of the item is written by the numeral keys of the typewriter, and mechanism which is set as the rate or price is written by the typewriter, there being automatic mechanism for causing the rate mechanism to operate the dial wheels of the item computer, in orders selected according to the order of the rate digit, a number of times corresponding to the amount of that digit so that these item wheels are caused to indicate the product of the item times the rate. I further couple with the same typewriting machine an adding mechanism operated by a portion of the mechanism referred to, which automatically totalizes the amounts shown by the product-accumulator when the operator type-writes them into the extension column on the paper.

In carrying out my object, I provide a product accumulator, a totalizing accumulator and those sets of actuating mechanisms therefor, namely a multiplicand actuator, a multiplier actuator and a totalizer actuator. Each of these actuators is set by the numeral keys of the typewriter, and the first two actuators coact to add products on the product accumulator; the third actuator adding the product there shown onto the totalizer when the numeral keys print the products. The same mechanism connects the numeral keys with the three actuators, which are selected according to the position of the typewriter carriage, and a mechanism common to all the actuators does the mechanical work of operating them. I prefer to mount the accumulators and actuators in a suitable casing on which an ordinary typewriter is placed.

These and other features of the invention will now be described in connection with the accompanying drawings and thereafter definitely summarize in the claims.

Figure 2:
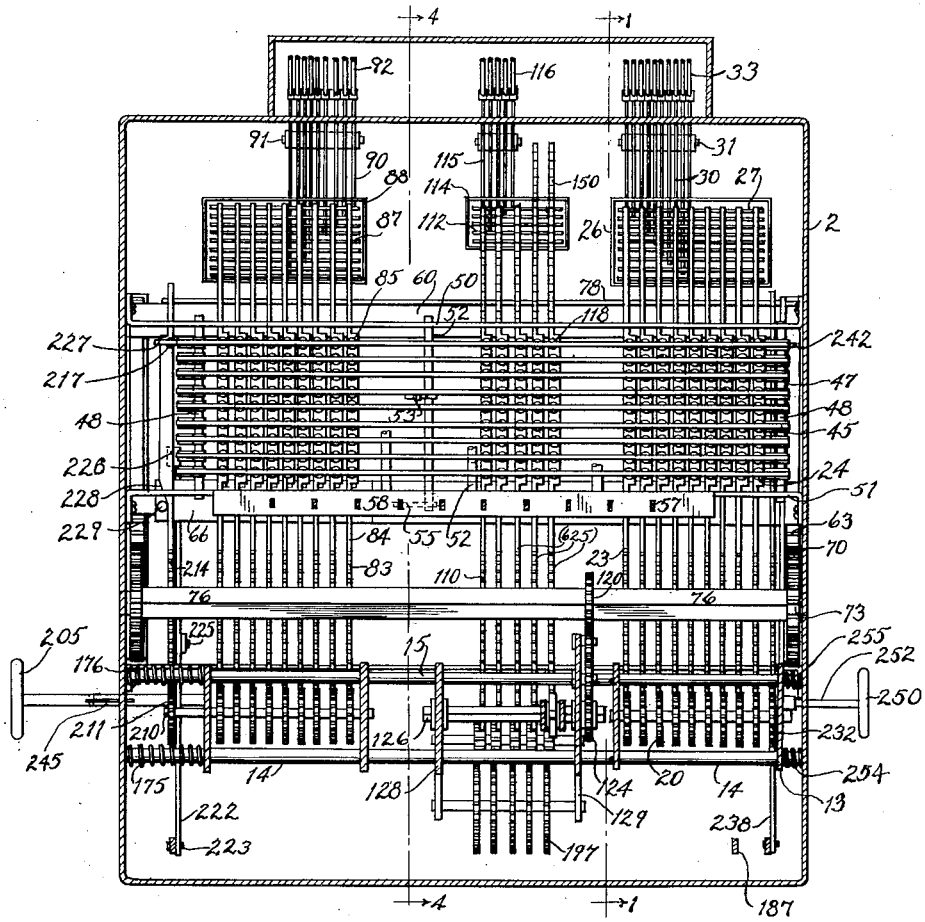
Figure 3:
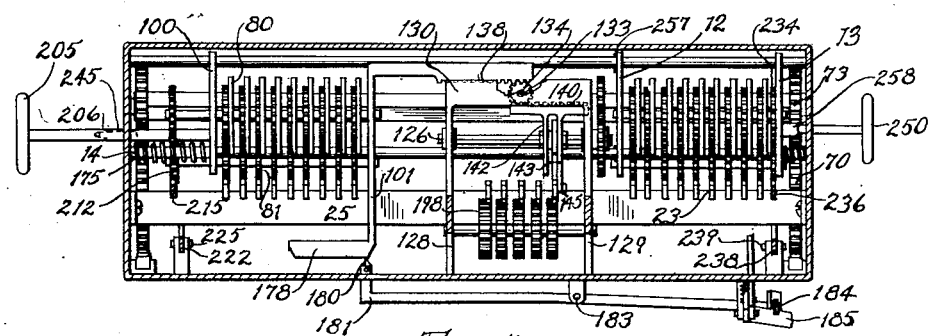
Figure 4:
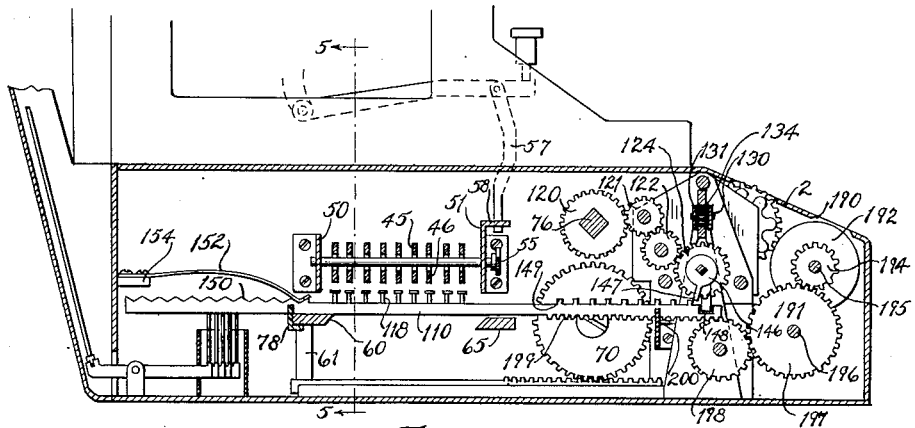
Figure 5:
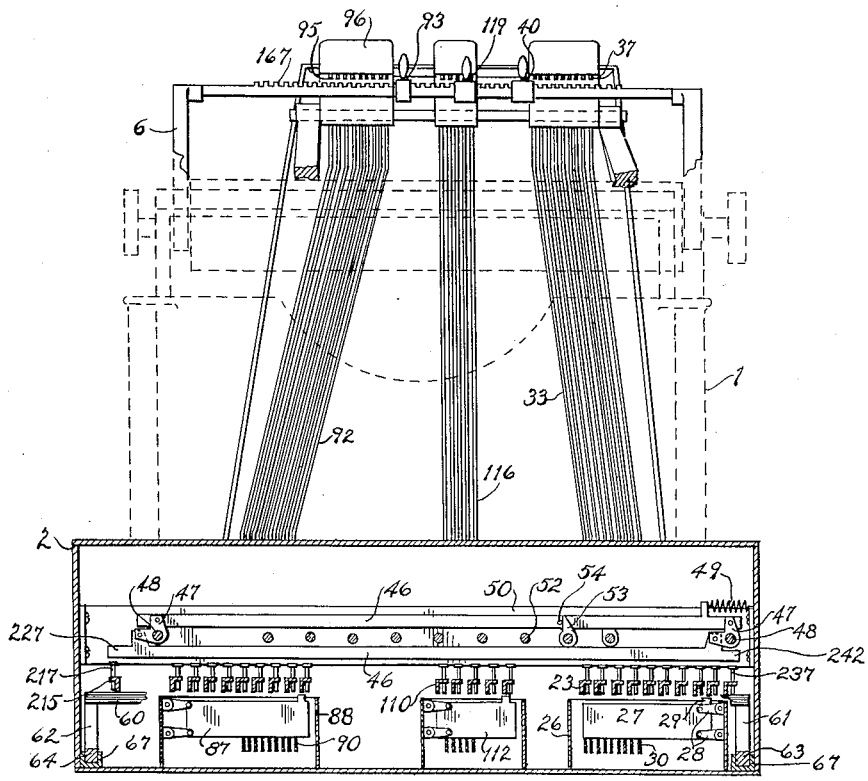

Referring to the drawings, Figure 1 is a side elevation of a typewriter shown connected with my mechanism in which part of the mechanism is shown in section on a plane indicated by line 1—1 on Fig. 2. Fig. 2 is a horizontal section showing a plan of the operating mechanism; Fig. 3 is a front view of this same mechanism with the casing in section; Fig. 4 is another transverse section taken through the casing substantially along the line 4—4 in Fig. 2, showing those parts by which the repeated additions constituting the multiplying operations are made. Fig. 5 is a cross section of the casing substantially along the lines 5—5 in Fig. 4, showing the connection to the typewriter carriage which appears in this view with the outline of a typewriter in broken lines. Fig. 6 is a top plan of the entire mechanism, the letter keys of the typewriter and their mechanism being omitted for clearness of illustration. Figs. 7 and 8 are details of one of the slidable selecting dogs carried by the carriage of the typewriter; Fig. 9 is a sectional detail of a suitable clutch through which the motor drives my mechanism; Figs. 10 and 11 are details of the sliding sleeve which acts to reset parts of the actuating mechanism for the product accumulator; Fig. 10 being a plan of the sleeve and Fig. 11 a section of same; Fig. 12 is a sectional front elevation of one of the brackets in which are mounted the parts of the selecting mechanism actuated by the carriage of the typewriter; Figs. 13 and 14 are details showing a convenient method of mounting the pins in the slidable bars which constitute a part of all the actuating mechanism; Fig. 15 is a detail of the gear on the central shaft of each adding mechanism for setting the same to zero.

1 represents an ordinary typewriter adapted to write desired words and figures; 2 the casing in which most of the computing mechanism is mounted; 3 the motor by which such mechanism is driven; 5 the usual numeral key of a typewriter; 6 the typewriter carriage.

Without limiting myself to any form of adding mechanism, I prefer to use the Hanson device, as shown in his patent on a calculating machine and typewriter attachment No. 816,319. I also use operating mechanism somewhat similar to that shown in that patent.

At the right of the device is shown conventionally in Fig. 3 a Hanson type of adding mechanism 10. A suitable frame is provided for this mechanism by the two plates 12 and 13 supported by three rods 14, 15 and 16, which run horizontally across the case 1. The operation of this adding machine is similar to the operation described in the Hanson Patent No. 816,319, heretofore mentioned, and will be described later.

Small gears are so arranged that each meshes with a gear on each dial wheel and is rotated by engagement with a rack 22 on the unit bar 23, there being one of these unit bars 23 for each dial wheel. The forward end of these bars is supported and guided by a comb formed on the upper edge of a strip 25 extending across the case 1 and having its ends secured to the sides of the case. On each of these bars are nine pins 24 adapted to stand in raised or lowered positions. These pins correspond to the numerals from one to nine, and the bars on which they are mounted correspond to the orders in the given number to be registered in the adding machine.

At the rear of the unit bars 23 is a selecting device comprising a casing 26 in which are mounted nine movable blades 27, each of which is pivoted at the ends of two parallel swinging arms 28, thus permitting a parallel arcal movement of each blade. At the upper edge of each blade 27 is a tooth 29 which engages one of the bars 23 when the blade is raised, and there is provided for each blade a lever 30 which may raise the blade. These levers 30 are suitably pivoted at 31 and each has a small projection 32 at the end to raise the corresponding blade without disturbing any of the others. Pivotally connected to the opposite ends of the levers 30 are connecting links or rods 33 which abut at their upper ends small levers 35. These levers 35 are suitably pivoted at 36 and their forward ends stand over pins 37 which are adapted to be moved upwardly by the selecting dogs 40, thereby depressing the rods 33, raising the forward end of the levers 30 and the bars 23. The dogs are mounted on the typewriter carriage and move with it and select the orders according to the position of the carriage. These dogs will be hereinafter more fully described.

Over each of the pins 24 and extending clear across the casing 1 are two rows of parallel bars 45 and 46, one row above the other. Any of these lower bars are adapted to be moved downwardly to engage and depress the corresponding pin 24 of any lever 23 which may be in the raised position, such a pin 24 corresponding to the number of the numeral key depressed, there being one pair of these parallel bars for each numeral key. These bars 45 and 46 are supported at each end by small bell cranks 47 pivoted on two small rigid shafts 48, these shafts being supported at each end in a suitable manner in the strips 50 and 51, which extend across the casing 1, the strips being suitably secured to the sides of the casing, as shown in Figs. 4 and 5.

Between the sets of parallel bars 45 and 46 just described are nine rock shafts 52 having a bearing at each end in the strips 50 and 51, each one having a short rock arm 53 engaging a pin 54 on a bar 45 corresponding to the numeral key depressed. On the forward ends of each of these rock-shafts 52 are small levers 55, (Figs. 1 and 2) which may be depressed by the depending finger 57, which is pivotally attached to the numeral key 5. The upper edge 58 of the strip 51 is extended and bent forward at right angles and has openings to guide the fingers 51. The depressing of the numeral key 5 rocks the corresponding rock arm 53, through its shaft 52, moves the bar 46 to the left by reason of the rock arm 53 engaging the small pin 54. Springs 49 return these parts to their normal position. Such a movement through the bell cranks 47 moves the lower bar 46 downwardly, depresses the corresponding pin in any of the bars 23 which may be raised.

When several of the pins 24 are depressed the corresponding number is registered in the adding mechanism by the following means: Running clear across the machine under these bars 23 is a horizontal bar 60 mounted on two uprights 61 and 62, Fig. 5. These uprights are carried by two slidable racks 63 and 64 sliding in suitable troughlike bearings 67 on the bottom of the casing 1. Rigidly attached to the bottom of the rack 62 is a U-shaped member 68 which straddles the upper end of the member 69 and may be operated by any suitable means to slide this rack reciprocably in its bearing. The means shown for effecting this sliding will be hereafter described.

At each side of the casing, meshing with the racks 63 and 64, are gears 70 and 71 which transmit motion to the gears 73 and 74 on each end of the square shaft 76, which extends across the casing 1, and has a bearing at each end in the casing. On this shaft 76 are mounted the toothed arms 77 which are part of the carrying mechanism of the present Hanson mechanism. Some of the mechanism heretofore described is similar to the mechanism used by Hanson, and described in the patent cited, to connect his mechanism with a typewriter; and reference may be made to that patent for a fuller explanation of details.

The operation of the mechanism heretofore described is briefly as follows: The movement of the typewriter carriage 6 raises the pins 37 of the order selector one at a time, thus depressing the link 33 through the movement of its lever 35 and raises a lever 31 and a blade 27, thus selecting one of the bars 23 corresponding to the order of the digit in the column on the typewriter paper. The depression of the numeral key prints on the typewriter paper the digit to be written in this column, and through the mechanism described, depresses one of the bars 46 corresponding to such numeral key, and by reason of the unit bar 23 being raised, the pin under such a bar 46 is depressed and remains so when the unit bar drops back to its normal position when released by the dog 37, on the farther movement of the carriage.

Several of the pins 24, having been depressed in the same manner, corresponding to a number to be registered in the adding machine, stand projecting below the unit bars 23, as shown in the case of one of the pins in Fig. 1. In such position the depressed pin is engaged by the forward edge of the universal bar 60 in its forward movement, which is driven by the arm 69 connected with the motor, as shown in Fig. 1. Thus, as the universal bar 60 moves forward it engages the several depressed pins and moves the unit bars carrying those pins forward a distance corresponding to the value represented by the pin depressed. These pins are set back, or rather raised to their normal position by the beveled edge of the cross bar 65, which also extends clear across the casing 1, being supported at its ends on the sides thereof. On the forward movement of any unit bar 23 the rack 22 engages the gear 20 and moves the corresponding dial wheel accordingly, thus registering the number that the typist has written on the typewriter paper, the unit bar 23 being returned by means of the hooked portion 44 engaging the edge of the bar 60. These unit bars as well as those of the other sets are guided by suitable notches in the angle bar 78 carried by the bar 60.

The starting of the motor, after writing the number, may be by any suitable means, such as the depression of a key which connects a circuit, or by mechanical means such as the releasing of the clutch, connected with a constantly running motor. The latter is the form shown in the drawings, and will be hereinafter more fully described.

The preceding description has been directed more particularly to the totalizer mechanism. It is to be understood that similar mechanism is employed with the other actuators. That is to say I use three dogs corresponding to 40, three sets of levers corresponding to 35, three sets of connecting links corresponding to 30, three sets of selecting devices, three sets of unit bars, all having pins similar to the pins 24, adapted to be depressed by the levers 46 in the manner described.

In the left hand portion of the casing the product accumulator 80 (shown conventionally in Fig. 3) is mounted, and into this accumulator is registered repeatedly the number to be multiplied. The method for doing this I will now describe.

The dial wheels of the adding mechanism 80 are each in mesh with gears 81 corresponding to the gears 20, and are operated by the racks 83 on the unit bars 84 which correspond to the unit bars 23. These bars 84 have pins 85 and are selected by blades 87 of the selecting devices 88 similar to the selecting device 26, these blades 87 being raised by levers 90, suitably pivoted at 91 and operated by links 92. These links are depressed by a dog 93 raising the pins 95, suitably held in a head 96 and operating through levers similar to 35, the whole movement being similar to the one heretofore described for the totalizer mechanism.

The adding mechanism 80 is mounted in a frame one end (100) of which is a plate through which pass the rods 14, 15 and 16, the other end of the frame being a plate 101 through which the two lower rods 14 and 15 pass. This allows this adding mechanism to slide loosely along these rods.

The multiplier set of operating and selecting mechanisms is shown between the selecting operating and adding mechanism just described and such mechanisms previously described. The unit bars 110, which are somewhat similar to the unit bars 23, but may be fewer in number, and the blades 112 in the selecting device 114 may be fewer in number than the others. As the multiplier usually represents a price or rate which is seldom a number of over five digits, five is the number of unit bars shown in the drawings. These unit bars 110 are raised in the manner previously described by levers 115 through links 116, and have pins thereon 118, and are selected by a dog 119, the same as the other two sets, but these unit bars do not register with an adding mechanism as those of the other two sets.

On the square shaft 76 is a gear 120, which drives through idlers 121 and 122 a gear 124, the same size as the gear 120, mounted on the square shaft 126. This square shaft 126 has suitable bearings at each end in a stationary frame composed of two plates 128 and 129. The plate 129 is shown as having mounted thereon suitable studs carrying the two idler gears 121 and 122. Connecting these two plates at their upper ends are connecting bars 130 and 131, and mounted on a short shaft 133 between these two bars is an idler gear 134 which meshes at its upper side with a rack 138, which is rigidly connected to the plate 101, as shown in Fig. 3. A rack 140 meshes with the lower side of this gear 134 and is rigid with a small frame extending downwardly and supported on a suitable bearing 142 around the shaft 126. This frame has two portions, 143 and 144, between which is mounted a disk 146, slidable along the shaft 126, and which has a projecting finger 147 adapted to engage teeth 149 on the upper edge of the unit bars 110. These teeth are spaced apart correspondingly with the pins 118 so that, as this disk 146 revolves, the unit bar 110 will be moved back a distance equal to the spacing of these teeth 149, at each revolution of the shaft 126. An extension 145 of the plate 143 engages the side of the bar 110 and positions the disk 146 over said bar. At the rear end of the unit bars 110 on the upper edge are formed notches 150. These notches are spaced equally with the teeth 149. A spring shown at 152 mounted on the block 154 rigid with the back wall of the casing 1 engages these notches to prevent a movement greater than the distance of one tooth for each revolution.

The dogs 40, 93 and 119 for selecting the orders in the three actuators are all mounted on blocks as shown in Figs. 7 and 8, in which the block is designated 160. Each dog is pivoted on a screw 161 at one end of the block, the other end being on a shaft 162. This shaft has one flattened side against which the leaf spring 163 is adapted to press and hold this block in a horizontal position, which brings the teeth 165 in mesh with the rack 167. This rack 167 and the shaft 162 are rigidly mounted on the two arms 6 carried by the carriage of the machine.

It will be seen from Figs. 1 and 6 that the blocks 160 are of different lengths and that the pins 37 and the corresponding pins in the other sets stand in three different paths. These blocks are movable along the shaft 162 and held in any position by the engagement of the teeth 165 with the rack 167, thus allowing the printing of the columns on the typewriter paper in any desired position.

The shape of the dogs 40, 93 and 119 is shown in Figs. 7 and 8. In their operative position they stand upright, the cam at 168 on the dog being the means for raising the pins 95 and the corresponding pins in the other sets. It is desirable on the return of the carriage to have these dogs inoperative. On the block 160 is a small projection shown at 169 against which the dog abuts in operative position, and another leaf of the spring 163 shown at 170 allows the dog to fall away from the operative position and drag loosely across these pins on the return of the carriage. A small handle 191 is provided for conveniently moving these little blocks. As all three of these blocks shown in Figs. 1 and 6 are the same except for their length, the foregoing description applies to all of them.

Now, when the typist writes the item, representing, for instance, 125 barrels of flour at $6.25 per bbl., the number 125 would be registered on the pins 85 by the depression of the numeral keys, the location of the block 160 properly positioning the column on the typewriter paper. Beginning on the third unit bar 83 counting from the right the pin No. 1 (nearest the front) would be depressed; the next digit (i. e. 2) would depress the second pin on the bar next to the right; and the digit 5 would depress the fifth pin on the right hand bar. Then the name of the item ("barrels of flour at $") would be written between this column and the next column. The block carrying dog 119, through the connections heretofore described, would select certain of the unit bars 110 on the depression of the numeral keys. The pins in these bars would be depressed corresponding to the number 625, i. e., on the bar 118 third from the right in Fig. 2 the 6 pin would be depressed, on the second bar from the right the 2 pin, on the right hand bar the 5 pin.

Now, when the motor is started, the universal bar 60 is carried forward by means of the racks 63 and 64, and the depressed pins on both of these sets of unit bars (83 and 110) are engaged by the forward edge of the universal bar and carried forward. Now on the unit bars 110 these pins 118 would be raised to normal position or "wiped out" by their engagement with the inclined edge of the bar 65. By means of the spring 152 engaging the teeth 150 they would remain forward in the positions set until the finger 147 on the disk 146 sets these bars back, one tooth at each revolution of the square shaft 126. This disk is revolved for the first unit for five times, at the end of which time the extension 145 on the arm 143 comes opposite a notch 148 in this bar 110. Compression springs 175 and 176 on the rods 14 and 15 move the adding mechanism 80, and by means of the rack 138 revolve the pinion 134, and move the rack 140 on the frame 144 to the left until the arm 143 engages the next unit bar 110. The five revolutions of the finger 147 on the disk 146 on square shaft 126, corresponding to five rearward movements of the bar 60, the number 125 has been five times registered in the unit position, on the product accumulator.

The pins 118 are raised to normal position by the bar 65 so that these pins may be ready to be set for the next multiplier. The forward positions of the bars 110 correspond to the multiplier and control the number of actuations of the unit bars of the multiplicand.

Now with the arm 143 resting against the side of the next unit bar 110, the number will be added twice, with the tens dial in the adding mechanism 80 standing over the bar 84 representing the units order of the multiplicand. The pins representing the multiplicand (125) are still depressed and the motor still running. In this operation the bar 60 moves rearward twice, while the racks 63 and 64 (through the gears 70 and 73, the square shaft 76, the gear 120, the idlers 121 and 122 and the gear 124) revolve the shaft 126, and the finger 147 revolves the same as before, moving the bar 110 back one tooth at each revolution until the extension 145 again registers with the notch 148 in the bar 110 and moves to the next bar, by reason of the springs pushing the adding mechanism 80 along the rods as before. The backward movement of each of the bars 110, caused by the finger 147, takes place at the instant when all of the racks 83 are in the rearmost position, to which they are moved by the universal actuating bar 60. When the bars 84 with their racks 83 are in this position, these racks are entirely out of engagement with the gear wheels 81 of the adding mechanism 80. There is sufficient length of time taken up in the completion of the stroke of the racks after they pass out of engagement with the wheels and before they become engaged with said wheels on the forward stroke, for the wheels to move a step transversely of said racks. Accordingly, if these wheels are shifted laterally a distance equal to the space between the racks 83, when these racks are again moved forwardly they will each engage the gear teeth of the next adjacent gear in the adding mechanism, and meshing with the same will actuate such gears. These racks 83 preferably have their end teeth so shaped that they may readily come into mesh with the gears 81 on their forward movement. The same operation is repeated six times in the hundreds column, i. e., with the hundreds dial in the adding mechanism 80 standing over the units of the bars 83. Thus it will be seen that the number 125 has been really multiplied by 5 and then by 20 and then by 600, which is the equivalent of multiplying by 625.

Now the product accumulator 80 and the frame 142 are in the positions shown in Fig. 3. At the beginning of this operation the motor must be started by the operator and it must stop automatically at the end of such an operation, i. e., when a number is registered the proper number of times in the adding mechanism 80 so that the single multiplying operation is complete. To accomplish this I provide on the plate 101 an extension having at its lower end a bar 178 at right angles to the plate and extending parallel with the movement of the mechanism 80. At each end of such a bar is an incline or cam which on the sidewise movement of the mechanism 80 depresses a dog 180 carried on the upright end 181 of a lever 182. This lever is suitably pivoted at 183 and engages at the end 184 a suitable lever 185 to release the clutch to allow the motor to operate the mechanism at the beginning of the movement of the mechanism 80. The lever 185 is suitably pivoted at 186 and is adapted to also be operated by a key 187, which is shown above the casing 2 in Fig. 6, when adding the totals in the mechanism 10. A spring 191 is adapted to return these parts to the normal position in which to throw out the clutch and allow the motor to run freely.

To start the motor the operator merely depresses a spring 245 in the rod 206, which acts like the catch in an umbrella rod, and allows the rod 206 to slide through the opening in the wall of the casing 2, until the extension 145 engages the first bar 110, and the bar 178 stands over the dog 180 (as shown in Fig. 3) thus releasing the clutch and starting the mechanism. Now, when the extension 145 is allowed to slide freely through all the notches 148 in the bars 110 the adding mechanism is moved the full distance to the right; the bar 178 is of such length that it then passes off of the dog 180 and allows the return of the lever to its normal position, thus releasing the clutch. This dog 180 is pivoted to the bar 181 and allows the bar 178 to slide over it without depressing the lever 181 when the mechanism is drawn to the left. A spring, not shown, acts to return this dog to normal active position at the end of this movement. Such a clutch as above mentioned is shown below the casing in Fig. 1 as connected with the Scotch yoke, which serves to oscillate the member 69 connected with the rack 63. The sectional detail in Fig. 9 of the same clutch will be hereinafter more fully described.

After two numbers have been multiplied together, the typist reads through the small aperture 177 in the front of the casing 1, Fig. 6, the number or result of such multiplication, and then writes such result in suitable column on the typewriter paper by the usual depression of the numeral keys, thus setting down the pins 24 on the unit bars 23 of the totalizer actuator first described. This selection is made by the dog 40, as shown in Figs. 5 and 6, coming into engagement with the pins 37 and raising the unit bars 23 in the manner previously described, thus setting down the pins corresponding to the result of the multiplication. The typist then again starts the motor which registers such a number in the totalizer accumulator 20, heretofore mentioned. Thus, after each multiplication the results are registered in this totalizer adding mechanism and, of course, added to the previously registered products, so that after writing the several items the typist may read the total through the aperture 188 in the front of the case 1, Fig. 6, and thus give the total amount of the bill written. The number written as the multiplicand can be verified by reading through the aperture 177 after the first movement of its operating mechanism.

In order to verify the number written as the multiplier (or the amount 625 in the example given), and to prevent the operator copying an incomplete product showing in the product accumulator, I provide a simple indicating mechanism shown at 190, Fig. 6, which consists merely of a dial wheel 192 for each notch bar 110, having a gear 194 rigid therewith, and idler gears 197 for each of these in mesh therewith, all of these gears being mounted on suitable shafts 195 and 196. These shafts are held in extensions of the frame plates 128 and 129. To allow the unit bars 110 to position the dial wheels 196 and still be geared therewith, I provide other gears 198 for each of these idlers 197. The gears 198 mesh with the rack 197 at the forward end on the lower edge of the unit bars 110. These gears 198 are of sufficient width to allow the racks 199 to mesh on one side as shown in Fig. 3, the gears 196 also meshing therewith, but standing out of the path of the unit bars 110. The gear 194 has a pitch circumference equal to the full distance that the unit bars 110 may move. Thus, on the forward movement of these bars, the distance corresponding to the pin depressed is registered by the numeral on the dial 192 showing through the aperture 190 in the casing 1.

It is obvious that on the return movement of the bars 110, the indicating dials are automatically set back to zero, as the gears just described are constantly in mesh, thus, as long as any number of significance shows on the dial wheels, the operator knows the product is not complete. A bearing surface greater than the distance between two teeth is provided by a small projection 200 where the unit bars 110 pass through the strip or comb 25, such a bearing allowing the unit bars 110 to ride smoothly at such a point.

To set the mechanism in readiness after each multiplying operation, a knob 205 is provided on the end of a small rod 206, which is rigidly attached to the plate 100 of the frame holding the adding mechanism 80; thus when this rod is pushed in to its innermost position, the adding mechanism 80 is brought to a position when the 10,000 order is over the unit actuating bar 83, because there are five orders provided for in the multiplying mechanism. The frame 142 is thus moved to the position shown by means of the connections through the pinion 134 previously described. Also after each multiplying operation it is desirable and oftentimes necessary to set the adding mechanism back to zero. There are many methods of setting an adding mechanism to zero. The simplest principle in the mind of the inventor at present is that of giving the central shaft of the adding mechanism one rotation in either direction, and having means on this shaft for picking up each dial wheel in whatever position it may be and carrying it back to zero.

I prefer to set the adding mechanism to zero by rotating the central shaft in a direction opposite to that given the dial wheels when the numbers are registered. Accordingly I provide on the central shaft 210 a gear 211 which through a pinion 212 carried by the frame of the mechanism 80 is operated by a rack 214 on a bar 215 somewhat similar to the other unit bars and carried in the same manner. However, instead of the usual nine pins, I provide only one pin 217 in the position of the 9th pin, so that, when such a pin is depressed, the bar 215 has the full forward movement. The bar 215 has a hook corresponding to the hook 44 on the unit bars 23 adapted to carry the bar back after being moved forward.

The forward movement of the bar 215 only takes place when the operator depresses a key 220, Fig. 6, which is connected to the lever 222 at the point 223. This lever is suitably pivoted at 225 and is bent at its rear end 226 to engage with the bar 215. This raises the bar 215 a distance great enough to depress the pin 217 by reason of its engagement with the extension 227 on the ninth bar 46 (Figs. 2 and 5) standing over this pin while such bar is in its normal position. Thus the distance that the bar 215 is raised at this point is necessarily greater than the raising of any of the unit bars in the other sets, as previously described. Now when the operator has pressed this key 220 the pin 217 is depressed through the connections described, and on starting the motor the bar 60 moves forward carrying with it the pin 217, necessarily moving the bar 215 forward the full distance. Such a movement gives the gear 211 one complete rotation, but such a gear (by reason of a ratchet connection with the shaft) is adapted to revolve the central shaft only in one direction, and is accordingly idle on the forward movement; on the rearward movement, however, the central shaft is rotated one complete revolution, and by suitable means (such as is shown in the patent to Hanson, 816,319) on the shaft the various dial wheels are picked up from any position in which they stand and carried back to a zero position.

The adding mechanism is set back to zero as above described, but in order to set back the pins 85, which were depressed on the preceding operation, this forward movement of the bar 60 just mentioned picks up the various depressed pins 85, and carries them forward once more. On the bar 215 is a cam 228 engaging the pin 229 rigid on the sleeve 66. One end of the bar 65 is smaller and of rectangular shape, over which slides a sleeve 66 carried on a rectangular reduced portion of the bar 65, and having a beveled edge the same as the rest of the bars, but also having notches spaced the same as the unit bars 83, such notches normally standing in the path of the pins 85 and allowing them to move forward repeatedly without being raised, as described in connection with the first adding mechanism.

As previously described the engagement of the cam 228 with the pin 229 moves the sleeve 66 shown in Fig. 2 to the left, bringing the notches out of the path of the pins and allowing the beveled edge of the sleeve 66 to engage the pins and cam them upwardly to their normal position. This movement of the pins registers once more a corresponding number in the adding mechanism, which is of no consequence, however, for it is on the return movement that the adding mechanism is set back to zero.

In order to set the adding mechanism 20 to zero, I provide a gear wheel 232 in mesh with a gear 234 on the central shaft of this adding mechanism. This gear 232 is in mesh with a bar 236 which is similar to the bars 23 in the adjacent set and carried by the same means, but has only one pin 237 in the 9th position, the same as the bar 215. This pin 237 is depressed on the raising of the bar 236 by means of a lever 238 suitably pivoted at 239, this lever being movable by means of the key 240, Figs. 1 and 6. Thus when the operator depresses this key 240 the lever 238 raises the bar 236 and depresses the pin 237 by its engagement with a small extension 242 on the bar 46 above it, Fig. 5. This pin 237, having been depressed on the starting of the motor, is carried forward by the bar 60 and rotates the gear on the central shaft 234 of the adding mechanism 20 freely on its forward movement, but on its rearward movement sets the dial wheels to zero in the manner described in connection with the mechanism 80.

If the typist makes an error in copying a result shown in the result accumulator on the typewriter paper, it is desirable to provide means for correcting such an error before it is registered in the totalizer accumulator. To accomplish this I provide a knob 250 on the short rod 252 rigidly attached to the plate 12 which forms a side of the frame in which this totalizer mechanism 20 is mounted. Now this frame is slidably mounted on the bars 14, 15 and 16 and is normally held in its operative position, that is with the gears 20 standing in the path of the racks 22, by means of springs 254 and 255 on the rods 14 and 15. These springs hold the frame against the pins 257 in each of the rods 14, 15 and 16 which limit its sidewise movement so that it stands normally in the operative position shown in the drawings. Now when the operator finds that she has depressed the wrong numeral key in copying results to be added in this column of totals on the typewriter paper, she pulls out the knob 250 until the shoulder 258 on the rod 252 abuts the side of the casing, which brings the gears 20 of the totalizer mechanism out of the path of the racks 22 and starts the motor by depressing the key 187 and allows the mechanism to operate once, which by the means heretofore described would reset the pins 24 without changing the total already added in the totalizer accumulator. The operator then releases the knob 250, allowing the totalizer mechanism to assume its normal position and rewrites the number correctly, which is then registered in the totalizer accumulator in the manner previously described.

The operation of the clutch shown in Fig. 9 is as follows: A disk 260 is loosely mounted on a stud 261 held in a suitable frame 262 which incloses the clutch and Scotch yoke heretofore mentioned, and has a groove 264 in its periphery, which guides the end of the lever 185. A pin 266 is slidably mounted in this disk near the periphery and has one side cut away forming a cam 267 adapted to slide the pin inwardly when engaged by the end of the lever 185. A small spring presses this spring outwardly, so that when the lever 185 is raised, it engages the teeth 270 formed on the side of the worm gear 271, which is mounted on the stud 261 adjacent to the disk 260. This gear 271 is driven constantly by the worm 273 on the shaft 274 of the motor. Now when the lever 185 is released, the pin 266 is pressed outwardly by means of the spring 268 and engages one of the teeth 270, which rotates the disk until the lever 185 again engages the cam 267 of the pin 266 and slides it inwardly out of engagement with the tooth 270, thus stopping the disk 260 while the gear 271 continues to rotate. A suitable pin 275 is rigidly held near the periphery of the disk 260 and engages the groove 276 of the Scotch yoke to oscillate it when the disk 260 rotates.

In Figs. 13 and 14 the means for holding the pins 24 or corresponding pins in the other sets of actuators is shown. A small spring 280 is suitably held between the two strips 283 and 285, which are rigid with the unit bar, and engages either of the two notches 286 and 287 in each of the pins, and holds them in their raised or lowered positions, as shown.

Fig. 15 shows a detail of either of the gears 211 or 234. The gear being cupped out on one side to receive a circular ratchet disk 290 rigid on the central shaft of the adding mechanism and a dog 291 suitably pivoted to the gear at 293. This dog is pressed into engagement with the teeth of the disk 290 by means of a small spring 295. It is obvious that the gear may be rotated freely in one direction without rotating the center shaft of the adding mechanism, while in the opposite direction the dog 291 will engage the teeth of the disk 290 and rotate the shaft.

Having thus described my invention, what I claim is:

1. In a combined typewriting and computing machine, the combination, with a typewriter, of mechanism controlled by the numeral keys of the typewriter for registering a multiplicand, mechanism controlled by the numeral keys of the typewriter for registering the multiplier, automatic mechanism for causing the registered multiplier and multiplicand to coact to indicate their product, and a totalizer controlled by the numeral keys of the typewriter and serving to add said products when typewritten by the typewriter.

2. The combination, with a typewriting machine, of two settable registers, mechanism adapted to connect each register with the numeral keys of the typewriter, whereby the typewriter may set one register to correspond with a certain multiplicand and the other register to correspond with a certain multiplier, mechanism coacting with both registers to operate one in accordance with the other, dial wheels operated by such coaction to indicate the product of the multiplier and multiplicand, and a totalizer controlled by the same numeral keys, whereby when the products are typewritten by the typewriter the totalizer may be set to add such products.

3. The combination with a typewriting machine, of automatically operating mechanism actuated by the typewriter to indicate products consequent upon the factors of the product being typewritten, and a totalizer automatically operated by mechanism adapted to be set by the numeral keys of the typewriter adapted to add the products as they are typewritten.

4. The combination, with a typewriting machine having numeral keys and letter keys adapted to write any desired words and figures, of two settable actuators controlled by said numeral keys, one actuator adapted to be set to correspond with one factor of a computation and the other with another factor, and mechanism for causing such two actuators to coact to indicate the product of such factors.

5. The combination, with a typewriting machine having numeral keys, a set of dial wheels, mechanism set by the numeral keys when writing a multiplicand, mechanism set by the numeral keys when writing a multiplier, and mechanism for causing the two mechanisms mentioned to coact on the dial wheels, whereby they indicate the product.

6. The combination, with a typewriting machine having numeral keys, two settable actuators, connections between the same and the numeral keys established according to the position of the typewriter carriage, whereby in one position the keys set one actuator and in another position set the other actuator, and mechanism for causing the two actuators to coact to indicate the product of the two factors thus set.

7. The combination, with a typewriting machine having numeral keys, two settable actuators, connections between the same and the numeral keys established according to the position of the typewriter carriage, whereby in one position the keys set one actuator and in another position set the other actuator, a set of dial wheels, and mechanism controlled conjointly by the two actuators mentioned for rotating the dial wheels to indicate the product of the two factors typewritten.

8. The combination, with a series of dial wheels, of an actuator therefor adapted to be set according to one factor of a computation, a second actuator adapted to be set according to another factor of the computation, mechanism for operating the first actuator a number of times corresponding to the setting of the second actuator, and mechanism for changing the relation of the dial wheels and their actuators according to the orders set on the second actuator.

9. The combination of a set of dial wheels provided with carrying mechanism, an actuator therefor having a set of individual movable bars adapted to operate the dial wheels, each bar having nine pins adapted to be set to represent a corresponding digit, and mechanism adapted to be set according to a factor of the computation and controlling the number of times said bars are moved, the pin in each bar controlling the amount of rotation given to the corresponding dial wheel by such movement, and mechanism for changing the relation of the bars and dial wheels according to the orders of the computation.

10. The combination, with a set of dial wheels, an actuator therefor comprising a series of individual movable bars, mechanism adapted to be set to control the amount of travel of the bar, whereby the corresponding dial wheel is turned an amount corresponding to a given digit, mechanism adapted to be set according to the digits of the multiplier and having a series of bars movable variable amounts according to the setting, and mechanism for moving the bars of the first set a number of times corresponding to the original setting of the bars of the second set.

11. The combination, with a set of dial wheels, an actuator therefor comprising a series of individual movable bars, mechanism adapted to be set to control the amount of travel of the bar whereby the corresponding dial wheel is turned an amount corresponding to a given digit, mechanism adapted to be set according to the digits of a multiplier and having a series of bars movable variable amounts according to the setting, mechanism for moving the bars of the first set a number of times corresponding to the original setting of the bars of the second set, mechanism for returning the bars of the second set to normal position by successive steps once for each movement of the bars of the first set, and mechanism for shifting the dial wheels with reference to their actuating bars, one order consequent upon the return of the bar of the second set to normal position.

12. The combination with a typewriting machine having numeral keys, a set of dial wheels, means for operating these dial wheels and means to be set by the numeral keys of the typewriter whereby they may represent any desired number, means for repeatedly operating the last mentioned means to register the number on the dial wheels, means located beside the first mentioned means for controlling the number of operations, and mechanism on the last mentioned means to be set by the numeral keys of the typewriter, such mechanism also controlling the orders in which desired number is registered on the dial wheels.

13. The combination of an adding mechanism with mechanism for operating the adding mechanism, means on the operating mechanism which may be set corresponding to any desired number, the adding mechanism being slidable so that the number set on the operating mechanism may be added in different orders on the adding mechanism, means for controlling the orders and said means being adapted to control the number of times the number is registered in the adding mechanism in each order according to a second given number.

14. In a device of the character described the combination of a typewriter having numeral keys of an adding mechanism, of bars having racks adapted to operate the dial wheels of the adding mechanism, of means on the bars adapted to be set according to any desired number, a reciprocable transverse bar adapted to engage the mechanism which is set according to a given number, another transverse bar having a cam on its edge adapted to reset mechanism on the bars, means connected with the numeral keys of the typewriter and selecting means on the typewriter for selecting bars corresponding to the orders of the number, and means for automatically controlling the number of reciprocations of the transverse bar according to a number by which the first bar is to be multiplied.

15. In a device of the character described, an accumulator slidably mounted for registering the results of multiplications of numbers, of bars having racks adapted to operate the dial wheels of such said accumulator, pins on these bars adapted to be depressed according to any desired number, selecting mechanism for determining on which bar a certain pin will be depressed and mechanism connected with the numeral keys of the typewriter for depressing the pins corresponding to the numeral key depressed, means for reciprocating these bars and operating the dial wheels of the accumulator thereby, a second set of bars having pins which may be depressed by the numeral keys of the typewriter, a second selecting device to determine on which bar the pin shall be depressed, means co-acting with these bars whereby the order in which the number will be registered in the accumulator is determined, and means in different paths on the typewriter carriage for selecting the orders in both of these sets of bars.

16. In a machine of the character described, the combination, with a typewriter having numeral keys, bars, adding mechanisms mounted on said bars having operating mechanism therefor, consisting of a set of bars for each adding mechanism, racks on the bars for rotating the dial wheels of the mechanisms, each of these bars corresponding to the order of a desired number to be registered in the adding mechanism, a second set of bars similar to the first set, a frame slidably mounted adjacent to the adding mechanism and connected therewith, such frame being adapted to engage the side of each bar in the second set to select the orders in which a desired number is registered in the adding mechanism, and means carried by the slidable frame for determining the number of times such a number is added in each order.

17. The combination of a set of bars having racks thereon, an adding mechanism adapted to be operated by these racks, said adding mechanism being slidably mounted so that its dial wheels may be operated by various bars of the set, a second set of bars having teeth thereon, mechanism on these bars adapted to be set corresponding to a desired number, a transverse bar adapted to engage the mechanism corresponding to the number on each set of bars and reciprocate the bars to register such a number in the adding mechanism on the first set, a frame connected with the adding mechanism to determine its position with relation to its set of bars, a projection on this frame for engaging the side of each bar in the second set, and a notch in each bar of the second set through which the projection on the frame passes from one bar to another to position the adding mechanism accordingly.

18. The combination, with an adding mechanism, of a set of slidable bars having mechanism thereon adapted to be set according to a desired number for actuating the dial wheels of the adding mechanism accordingly, means for repeatedly operating these bars, a second set of slidable bars similar to the first set adapted to be set in positions corresponding to any desired number, teeth on these bars adapted to be engaged by a finger revolving once for each actuation of the mechanism operating the first set of bars, whereby the numbers of the second set are moved one tooth for each revolution of the finger, a slidable frame carrying a finger and connected to the adding mechanism so that its engagement with the side of any bar determines the position of the adding mechanism relative to the bars of the first set, a plurality of rods on which the adding mechanism and frame are mounted, and springs on said rods for sliding mechanism along these bars.

19. The combination, with an adding mechanism, of a set of slidable bars having mechanism thereon adapted to be set according to a desired number for actuating the dial wheels of the adding mechanism accordingly, means for repeatedly operating these bars, a second set of slidable bars similar to the first set adapted to be set in positions corresponding to any desired number, teeth on these bars adapted to be engaged by a finger revolving once for each actuation of the mechanism operating the first set of bars, whereby the numbers of the second set are moved one tooth for each revolution of the finger, a slidable frame carrying a finger and connected to the adding mechanism so that its engagement with the side of any bar determines the position of the adding mechanism relative to the bars of the first set, a plurality of rods on which the adding mechanism and frame are mounted, springs on said rods for sliding mechanism along these bars, and a motor for actuating the bars of both sets, and means connected with the adding mechanism to automatically start the motor and stop it at the finish of the operation.

20. The combination of an adding mechanism, means for repeatedly registering a given number in the adding mechanism according to a second given number by which the first is to be multiplied, a multiplier mechanism, a second adding mechanism, a typewriter, means actuated by the typewriter keys whereby numbers may be registered on the two adding mechanisms and on the multiplier mechanism consequent upon such numbers being typewritten, a reciprocating actuating mechanism common to the adding mechanism and the multiplier mechanism, and a motor for reciprocating the actuating mechanism.

21. The combination, with a typewriter, of an adding mechanism, slidable bars having racks thereon meshing with gears on the dial wheels of the adding mechanism, the mechanism on these bars adapted to be set by the keys of the typewriter to correspond to any given number typewritten, an actuating means for sliding these bars whereby such a number is registered in the adding mechanism, means for resetting mechanism on the bars representing the number, and means whereby the adding mechanism may be slid out of the path of the racks on the bars so that errors in setting the mechanism representing the number may be corrected without disturbing the total already in the adding mechanism.

22. The combination, with an adding mechanism, of a set of bars, one for each dial wheel, means on the bars for actuating the dial wheel, a plurality of pins on each bar adapted to be set to represent any desired number, a reciprocating bar for engaging these pins to actuate the adding mechanism accordingly, a second bar having a series of cams thereon normally standing out of the path of the pins but adapted to be brought into the path of the pins for resetting them to their normal position.

23. The combination of a product accumulator, a setable actuator therefor, a multiplier actuator adapted to be set, means for operating the accumulator by a succession of strokes, the number of which corresponds to the setting of the multiplier actuator, the value of each stroke being dependent upon the setting of the first mentioned actuator, and means for automatically shifting the accumulator with reference to its actuator to the next order when it has been operated a number of times corresponding to the setting of the multiplier actuator for a given order.

24. The combination of a typewriter having letter keys and numeral keys, a product accumulator, a totalizer accumulator, an actuator for the product accumulator, a second actuator controlling the action of the first actuator, an actuator for the totalizer accumulator, means whereby the typewriter numeral keys are connected automatically, consequent upon the travel of the typewriter carriage, first with one of the product actuators, then with the other product actuator, and then with the totalizer actuator, and means whereby the two actuators first mentioned coact to cause the product accumulator to indicate the product of an item and a rate successively typewritten.

25. The combination of an accumulator, an actuator therefor adapted to be moved various amounts, means for setting the actuator to determine the amount of movement, a second actuator, means for setting it for various amounts, reciprocating means for moving the first actuator by successive strokes the number of which is dependent upon the setting of the second actuator and the value of which is dependent upon the setting of the first actuator, and a typewriter having numeral keys which act automatically on the first actuator and then on the second consequent upon the travel of the typewriter carriage.

26. The combination of an accumulator, an actuator therefor adapted to be set according to the digits of a multiplicand, reciprocating means for moving said actuator by strokes the value of which depends upon the setting of the actuator, a second actuator having members adapted to be set according to the digits of a multiplier, a device for returning the members of the second actuator to normal position by steps the number of which is equal to the number of the digit represented, and means whereby the number of steps of the second actuator controls the number of strokes of the first actuator.

27. The combination of an accumulator, an actuator therefor adapted to be set according to the digits of a multiplicand, reciprocating means for moving said actuator by strokes the value of which depends upon the setting of the actuator, a second actuator having members adapted to be set according to the digits of a multiplier, a device for returning the members of the second actuator to normal position by steps the number of which is equal to the number of the digit represented, means whereby the number of strokes of the first actuator controls the number of steps of the second actuator, and means for automatically changing the relative position of the accumulator and first actuator to change the orders acted upon when a member of the second actuator goes back to normal position.

28. The combination of an accumulator, an actuator therefor adapted to be set according to the digits of a multiplicand, reciprocating means for moving said actuator by strokes the value of which depends upon the setting of the actuator, a second actuator having members adapted to be set according to the digits of a multiplier, a device for returning the members of the second actuator to normal position by steps the number of which is equal to the number of the digit represented, means whereby the number of steps of the second actuator controls the number of strokes of the first actuator, means for automatically changing the relative position of the accumulator and first actuator to change the orders acted upon when a member of the second actuator goes back to normal position, and a typewriter having a traveling carriage and having numeral keys which are automatically connected with the first actuator and then with the second actuator as the carriage moves to change the paper from an item position to a rate position.

29. The combination of an accumulator, an actuator therefor adapted to be set according to the digits of a multiplicand, reciprocating means for moving said actuator by strokes the value of which depends upon the setting of the actuator, a second actuator having members adapted to be set according to the digits of a multiplier, a device for returning the members of the second actuator to normal position by steps the number of which is equal to the number of the digit represented, means whereby the number of steps of the second actuator controls the number of strokes of the first actuator, means whereby the device which returns the members of the second actuator automatically travels into coaction with the member of the next order of the second actuator consequent upon the given member returning to normal position, and a coupling between the said device and the accumulator whereby the shifting of the device is accompanied by a corresponding shifting of the accumulator with reference to its actuator.

30. In a machine of the character described, with a typewriter the combination of mechanism adapted to be set by the numeral keys of the typewriter to correspond to the multiplier, mechanism adapted to be set by said numeral keys to correspond to the multiplicand, mechanism coöperating with the two first mentioned mechanisms by a series of automatically repeated operations thereof to indicate the product.

31. The combination, with a typewriting machine, of mechanism adapted to be set by the numeral keys of the typewriter to correspond to the multiplier, mechanism adapted to be set by the numeral keys to correspond to the multiplicand, and mechanism coöperating with the two first mentioned mechanisms by a series of automatically repeated operations thereof to indicate the product, and a totalizer adapted to add said products consequent upon their being typewritten by the typewriter.

32. The combination of a typewriting machine, two sets of dial wheels, mechanism for registering factors of a product on said dial wheels consequent upon the depression of the numeral keys of the typewriter and including means for automatically causing the first set of dial wheels to indicate the product, and mechanism operated by part of the first mentioned mechanism for causing the second set of dial wheels to indicate the total of such product and previously written amounts.

33. The combination of an accumulator, an actuator therefor adapted to be moved various amounts, means for setting the actuator to determine the amount of movement, a second actuator adapted to be set for various amounts by the same means as the first actuator, reciprocating means for moving the first actuator by successive strokes, the number of which is dependent upon the setting of the second actuator and the value of which is dependent upon the setting of the first actuator.

In testimony whereof, I hereunto affix my signature in the presence of two witnesses.

HOLMES MARSHALL.

Witnesses:
  ALBERT H. BATES,
  BRENNAN B. WEST.